(12) United States Patent
Voegeli, Jr. et al.

(10) Patent No.: US 7,731,471 B2
(45) Date of Patent: Jun. 8, 2010

(54) MOTOR VEHICLE TIRE CARRIER

(75) Inventors: Anthony P. Voegeli, Jr., Fort Wayne, IN (US); Rosanne Knox, Troy, MI (US); Martin Thompson, Seymour, IN (US)

(73) Assignee: Dura Global Technologies, LLC., Rochester Hills, MI (US)

( * ) Notice: Subject to any disclaimer, the term of this patent is extended or adjusted under 35 U.S.C. 154(b) by 288 days.

(21) Appl. No.: 10/930,315

(22) Filed: Aug. 31, 2004

(65) Prior Publication Data

US 2006/0045689 A1  Mar. 2, 2006

(51) Int. Cl.
*B62D 43/00* (2006.01)
*B66D 1/00* (2006.01)
*B66D 3/04* (2006.01)

(52) U.S. Cl. .................. 414/463; 254/323; 254/389

(58) Field of Classification Search ......... 414/463–464, 414/466; 254/323, 389, 343, 362, 397, 403–404, 254/414, 416; 224/42.21, 42.22, 42.23, 42.24, 224/42.25, 42.12; 16/108; 226/196.1; 212/168
See application file for complete search history.

(56) References Cited

U.S. PATENT DOCUMENTS

| | | | | |
|---|---|---|---|---|
| 3,856,167 A | * | 12/1974 | Yasue et al. ............. | 414/463 |
| 3,892,386 A | * | 7/1975 | Hogan .................... | 254/390 |
| 4,072,213 A | * | 2/1978 | Salmon ................ | 188/322.5 |
| 4,535,973 A | * | 8/1985 | Dorr et al. .............. | 254/323 |
| 5,079,389 A | * | 1/1992 | Nelson .................. | 174/505 |
| 6,132,162 A | * | 10/2000 | Kito et al. ............... | 414/463 |
| 6,267,546 B1 | | 7/2001 | Oxyer et al. ............ | 414/463 |
| 6,427,981 B1 | | 8/2002 | Kingsbury et al. ...... | 254/323 |
| 6,443,846 B1 | | 9/2002 | Dziedzic et al. ......... | 469/41 |
| 6,471,191 B1 | * | 10/2002 | Rotzler et al. ........... | 254/389 |
| 6,527,252 B2 | * | 3/2003 | Dziedzic ................. | 254/323 |
| 6,692,216 B2 | | 2/2004 | Reznar et al. ........... | 414/463 |
| 2002/0040979 A1 | * | 4/2002 | Raz et al. ............... | 254/323 |

* cited by examiner

*Primary Examiner*—Gregory W Adams
(74) *Attorney, Agent, or Firm*—Gifford, Krass, Sprinkle, Anderson & Citkowski, P.C.; Kevin S. MacKenzie; Dean B. Watson

(57) ABSTRACT

A motor vehicle tire carrier includes a housing having an aperture. A drive shaft is rotatably secured to the housing. A spool is positioned in the housing and is rotatably driven by the drive shaft. A flexible elongate member has a first end secured to the spool, is wound about the spool, and extends through the aperture in the housing. A wheel plate is secured to a second end of the elongate member and is configured to support a motor vehicle tire. A crash plate is secured to the housing and has an aperture through which the elongate member extends, with the housing being secured to the crash plate. A guide member on the crash plate has an arcuate surface about which the elongate member will bend when the tire carrier is subject to a lateral force.

14 Claims, 1 Drawing Sheet

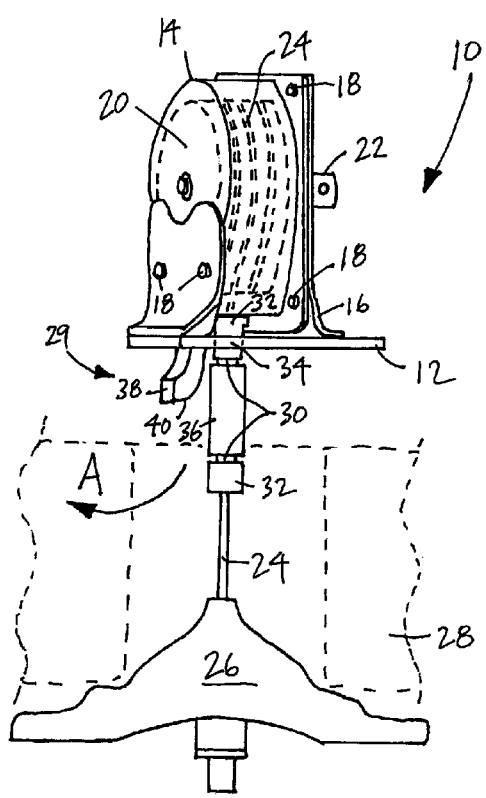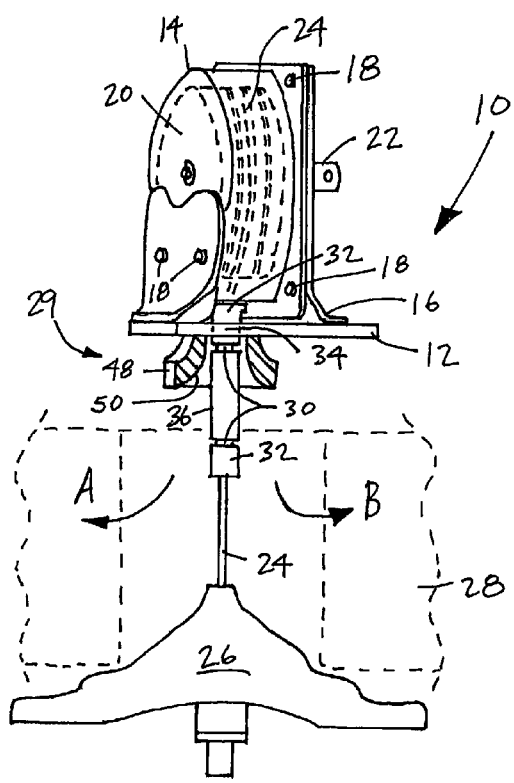
FIG. 1
FIG. 2

MOTOR VEHICLE TIRE CARRIER

FIELD OF THE INVENTION

This invention relates generally to a motor vehicle tire carrier, and, in particular, a motor vehicle tire carrier cable with a protective assembly.

BACKGROUND OF THE INVENTION

Vehicles with inflatable tires such as passenger cars, light and heavy duty trucks, tractor trailers, buses, commercial delivery vehicles, among other motorized forms of transportation and trailers pulled by such vehicles are conventionally equipped with spare tires. Some spare tires are stored under the vehicle using a tire carrier that includes a tire winch for raising and lowering the spare tire between a raised or stored position and a lowered or accessed position. The winch typically raises and lowers the spare tire using a flexible elongate member such as a cable or cord, which is wound and unwound on a spool or reel.

During a crash, lateral forces may expose the cable to a 90° bend or more, which may cause the cable to undergo shear failure. The load required to cause failure of a cable under a shear load is significantly less than that under a tensile load, and harder to predict as compared to the tensile load. It would be desirable to provide a protective assembly that would prevent the cable from encountering sharp bends and failing under a shear load.

It is an object of the present invention to provide a protective assembly for a tire carrier that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a motor vehicle tire carrier with a protective assembly that helps to protect the cable of the tire carrier when it undergoes a shear load. In accordance with a first preferred embodiment, a motor vehicle tire carrier includes a housing having an aperture. A drive shaft is rotatably secured to the housing. A spool is positioned in the housing and is rotatably driven by the drive shaft. A flexible elongate member has a first end secured to the spool, is wound about the spool, and extends through the aperture in the housing. A wheel plate is secured to a second end of the elongate member and is configured to support a motor vehicle tire. A crash plate is secured to the housing and has an aperture through which the elongate member extends, with the housing being secured to the crash plate. A guide member on the crash plate has an arcuate surface about which the elongate member will bend when the tire carrier is subject to a lateral force.

In accordance with an additional embodiment, a motor vehicle tire carrier includes a housing having an aperture with a drive shaft rotatably secured to the housing. A spool is positioned in the housing and is rotatably driven by the drive shaft. A flexible elongate member has a first end secured to the spool, is wound about the spool, and extends through the aperture in the housing. A wheel plate is secured to a second end of the elongate member and is configured to support a motor vehicle tire. A crash plate is secured to the housing and has an aperture through which the elongate member extends, with the housing being secured to the crash plate. A length of conduit surrounds a portion of the elongate member. Each of a pair of end caps is positioned at an end of the length of conduit.

In accordance with another preferred embodiment, a motor vehicle tire carrier includes a housing having an aperture, with a drive shaft rotatably secured to the housing. A spool is positioned in the housing and is rotatably driven by the drive shaft. A flexible elongate member is wound about the spool and extends through the aperture in the housing. A wheel plate is secured to an end of the elongate member and is configured to support a motor vehicle tire. A crash plate is secured to the housing and has an aperture through which the elongate member extends, with the housing being secured to the crash plate. A length of conduit surrounds a portion of the elongate member. A guide member on the crash plate has an arcuate surface about which the length of conduit and elongate member will bend when the tire carrier is subject to a crash force.

In accordance with a further embodiment, a motor vehicle tire carrier includes a housing having an aperture, with a drive shaft rotatably secured to the housing. A spool is positioned in the housing and is rotatably driven by the drive shaft. A cable is wound about the spool and extends through the aperture in the housing. A wheel plate is secured to an end of the length of cable and is configured to support a motor vehicle tire. A crash plate is secured to the housing and has an aperture through which the cable extends, with the housing being secured to the crash plate. A length of conduit surrounds a portion of the cable. A pair of end caps is positioned at opposed ends of the conduit and a sleeve encircles the conduit. A guide member extends from the crash plate and has an arcuate surface about which the length of conduit and cable will bend when the tire carrier is subject to a lateral force Substantial advantage is achieved by providing a motor vehicle tire carrier with a protective assembly. In particular, certain preferred embodiments of the present invention reduce the chance of the elongate member of a tire carrier undergoing shear failure from lateral forces encountered in a motor vehicle accident.

These and additional features and advantages of the invention disclosed here will be further understood from the following detailed disclosure of certain preferred embodiments.

BRIEF DESCRIPTION OF THE DRAWINGS

FIG. 1 is a perspective view of a motor vehicle tire carrier in accordance with a preferred embodiment of the present invention.

FIG. 2 is a perspective view of a motor vehicle tire carrier in accordance with another preferred embodiment of the present invention.

The figures referred to above are not drawn necessarily to scale and should be understood to provide a representation of the invention, illustrative of the principles involved. Some features of the motor vehicle tire carrier depicted in the drawings have been enlarged or distorted relative to others to facilitate explanation and understanding. The same reference numbers are used in the drawings for similar or identical components and features shown in various alternative embodiments. Motor vehicle tire carriers as disclosed herein would have configurations and components determined, in part, by the intended application and environment in which they are used.

DETAILED DESCRIPTION OF CERTAIN PREFERRED EMBODIMENTS

The present invention may be embodied in various forms. Referring now to the drawings, FIG. 1 illustrates a motor vehicle tire carrier 10 for a spare tire of a motor vehicle, such as a van or truck, according to a preferred embodiment of the present invention. While the illustrated embodiments of the present invention are particularly adapted for use with a van or truck it is noted that the present invention can be utilized with any motor vehicle having inflated tires such as automobiles, recreational vehicles, and off road vehicles, for example, dune buggies, golf carts, and the like.

Tire carrier 10 includes a crash plate 12 to which a housing 14 is secured. In the illustrated embodiment, housing 14 is secured to crash plate 12 by way of a pair of mounting brackets 16. Brackets 16 may be secured to housing 14 by way of fasteners 18, which could be rivets, bolts or any other suitable fasteners. It is to be appreciated that brackets 16 may be secured to housing 14 by any suitable fastening means, including, for example, welding. Similarly, mounting brackets 16 may be secured to crash plate 12 by any suitable fastening means, such as by welding, or by a fastener such as a bolt or rivet. It is to be appreciated that a single mounting bracket 16, or more than two mounting brackets 16, could be used to secure housing 14 to crash plate 12.

A spool 20 is rotationally supported within housing 14 on a drive shaft 22, which is rotatably secured to housing 14. A first end of a flexible elongate member 24 is secured to spool 20, with elongate member being wound about spool 20 and extending through an aperture (not visible) in housing 14. Elongate member 24 may be a cable, wire, cord, rope or other flexible member that can be wound about spool 20. In a preferred embodiment, elongate member 24 is a cable formed of flat wire or a plurality of wires twisted together. A second end of elongate member 24 is secured to a wheel plate 26, on which a spare tire 28 of a motor vehicle is supported.

Drive shaft 22 is rotatably driven by a user in conventional fashion, either manually or by an electronic control system (not shown) to rotate spool 20. As spool 20 is rotated, elongate member 24 is wound and unwound about spool 20, thereby raising and lowering wheel plate 26 and spare tire 28 to allow storage and access, respectively, of spare tire 28.

A protective assembly 29 for tire carrier 10 includes a length of conduit 30 that is positioned on elongate member 24 beneath crash plate 12. A first end cap 32 is positioned at a first end of conduit 30 and extends through an aperture 34 formed in crash plate 12. A second end cap 32 is positioned at an opposed second end of conduit 30. End caps 32 cooperate to maintain conduit 30 in position as elongate member 24 travels up and down through conduit 30. In certain preferred embodiments, a sleeve 36 surrounds conduit 30. In a preferred embodiment, sleeve 36 is formed of a plastomer or an elastomeric material, such as rubber.

A guide member 38 extends outwardly from crash plate 12. Guide member 38 has an arcuate surface 40 that faces conduit 30 and elongate member 24. In a crash of the motor vehicle, wheel plate 26 and spare tire 28 will with swing rapidly relative to crash plate 12, as illustrated by arrow A, due to lateral crash forces. As wheel plate 26 and spare tire 28 swing, the portion of elongate member 24 covered by conduit 30 engages arcuate surface 40 of guide member 38. The bending of conduit 30 and elongate member 24 about the curve of arcuate surface 40 serves to reduce the chance of shear failure of elongate member 24, which will often occur when elongate member 24 is subject to a sharp bend, such as a 90° bend.

In the illustrated embodiment, guide member 38 is a substantially J-shaped member that is secured to crash plate 12 by suitable fastening means, e.g., welding. Guide member 38 in such an embodiment is positioned with respect to crash plate 12 such that conduit 30 and elongate member 24 will engage arcuate surface 40 in a crash from either the front or rear of the motor vehicle.

Another embodiment is illustrated in FIG. 2, in which a guide member 48 is an annular member with an arcuate surface 50 formed on its interior surface. As seen here, annular guide member 48 has an inverted bowl shape. In this embodiment, guide member 48 advantageously provides protection for conduit 30 and elongate member 24 in a crash from any of multiple directions. Two exemplary directions are illustrated here by arrows A and B, however, it can be seen that the shape of guide member 48 will accommodate a crash force from any direction.

It is to be appreciated that guide member 38 may take any of numerous shapes. Guide member 38 may, for example, be a boss, protuberance, projection, extruded portion, or any other element extending outwardly from crash plate 12 that includes an arcuate surface about which elongate member 24 and conduit 30 will bend. Guide member 38 may be of unitary, that is, one-piece, construction with crash plate 12. In other embodiments, guide member 38 is a separate element that is secured to crash plate 12 by suitable fastening means.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A motor vehicle tire carrier comprising, in combination:
a drive shaft;
a spool supported by the drive shaft;
a flexible elongate member wound about the spool;
a bendable conduit disposed about the flexible elongate member;
a wheel plate secured to the elongate member and configured to support a motor vehicle tire;
a crash plate; and
a guide member connected to the crash plate the guide member having a curved surface about which the elongate member and the conduit will bend when the tire carrier is subject to a lateral force.

2. The motor vehicle tire carrier of claim 1, wherein the conduit includes a polymeric material.

3. The motor vehicle tire carrier of claim 2 further comprising a pair of end caps, the bendable conduit being otherwise fixed in a position relative to the elongate member which can travel up and down through conduit.

4. The motor vehicle tire carrier of claim 2, wherein the conduit includes a sleeve that encircles at least a portion of the length of conduit beneath the crash plate.

5. The motor vehicle tire carrier of claim 4, wherein the sleeve is formed of an elastomeric material.

6. The motor vehicle tire carrier of claim 1, wherein the flexible elongate member is a length of cable.

7. The motor vehicle tire carrier of claim 1, wherein the crash plate is secured by the mounting bracket.

8. The motor vehicle tire carrier of claim 1, wherein the guide member has an inverted bowl shape.

9. The motor vehicle tire carrier of claim 1, wherein the guide member comprises a substantially J-shaped member.

10. A motor vehicle tire carrier for carrying a motor vehicle spare tire comprising, in combination:
   a housing having an aperture;
   a drive shaft rotatably secured to the housing;
   a spool positioned in the housing and supported by the drive shaft;
   a flexible elongate member being wound about the spool and extending through the aperture in the housing;
   a wheel plate secured to the elongate member and configured to support a motor vehicle tire;
   a crash plate secured to reinforce the housing; and
   a protective assembly including a flexible length of conduit surrounding a portion of the elongate member, and a guide member having a curved interior surface facing the flexible length of conduit such that the length of cable and conduit will move toward and bend about the guide member when subjected to a lateral force.

11. The motor vehicle tire carrier of claim 10, wherein the protective assembly further comprises a pair of end caps connected to the conduit, one of the end caps extends through the aperture in the crash plate.

12. The motor vehicle tire carrier of claim 10, wherein the guide member comprises an annular member having a curved interior surface.

13. The motor vehicle tire carrier of claim 12, wherein the annular member has an inverted bowl shape with an arcuate surface.

14. The motor vehicle tire carrier of claim 10, wherein the guide member comprises a substantially J-shaped member having an arcuate surface.

* * * * *